(12) United States Patent
Schuh et al.

(10) Patent No.: US 9,568,054 B2
(45) Date of Patent: Feb. 14, 2017

(54) ACTUATING DEVICE

(75) Inventors: Bernhard Schuh, Nuremberg (DE);
Detlev Ulle, Ostheim (DE)

(73) Assignee: DE-STA-CO Europe GmbH,
Oberursel (DE)

( * ) Notice: Subject to any disclaimer, the term of this patent is extended or adjusted under 35 U.S.C. 154(b) by 24 days.

(21) Appl. No.: 13/808,747

(22) PCT Filed: Jul. 2, 2012

(86) PCT No.: PCT/DE2012/100195
§ 371 (c)(1),
(2), (4) Date: Mar. 25, 2013

(87) PCT Pub. No.: WO2013/004228
PCT Pub. Date: Jan. 10, 2013

(65) Prior Publication Data
US 2014/0144262 A1 May 29, 2014

(30) Foreign Application Priority Data
Jul. 7, 2011 (DE) .......................... 10 2011 107 397

(51) Int. Cl.
*F16D 63/00* (2006.01)
*B25B 5/06* (2006.01)

(52) U.S. Cl.
CPC ............. *F16D 63/006* (2013.01); *B25B 5/061* (2013.01); *B25B 5/064* (2013.01); *Y10T 74/188* (2015.01)

(58) Field of Classification Search
CPC ..................................................... F16D 63/006
See application file for complete search history.

(56) References Cited

U.S. PATENT DOCUMENTS 6,299,829 B1 * 10/2001 Chichery et al. ............. 266/245
2004/0032163 A1 * 2/2004 Bigo et al. ................. 303/116.4

FOREIGN PATENT DOCUMENTS

| DE | 1183204 | 12/1964 |
|---|---|---|
| DE | 10222815 A1 | 12/2003 |
| DE | 10256385 B3 | 2/2004 |
| DE | 202004016408 U1 | 3/2006 |
| DE | 102005017501 A1 | 10/2006 |
| DE | 102005049647 | 6/2007 |

* cited by examiner

*Primary Examiner* — Terence Boes
(74) *Attorney, Agent, or Firm* — Harness, Dickey & Pierce, P.L.C.

(57) ABSTRACT

An actuating device has an actuating member (2) pivotable in a first operating state about an axis (1). The actuating member (2) is connected in a torsion-proof manner with a toothed member (3). The toothed member (3), in a second operating state, prevents pivoting movement of the actuating member (2). The toothed member is coupled, in a lockable manner, with a detent member (4). The detent member 4 is movably mounted with respect to the axis (1).

20 Claims, 1 Drawing Sheet

ACTUATING DEVICE

CROSS-REFERENCE TO RELATED APPLICATIONS

Figure 1:
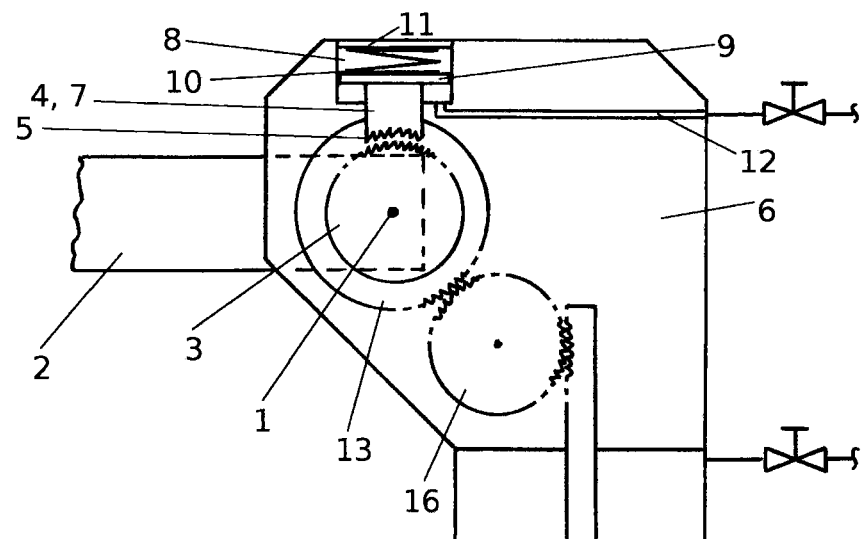

This application claims the benefit and priority of German Patent Application No. 10 2011 107 397.7, filed Jul. 7, 2011. The entire disclosure of the above application is incorporated herein by reference.

FIELD

The disclosure relates to an actuating device and, more particularly, to an actuating device with a tooth member lockable with a movable detent member.

BACKGROUND

An actuating device is known according to DE 1 183 204 A. This swivel device consists of an actuating member (crank) pivotable in a first operating state about an axis (swivel axis). The actuating member is connected in a torsion-proof manner with a tooth member (toothed wheel).

The disclosure is based on the problem of improving an actuating device of the above type. In particular, an actuating device is able to be arrested, if required.

SUMMARY

This problem is solved according to the disclosure by an actuating device that comprises an actuating member that is pivotable in a first operating state about an axis. The actuating member is connected in a torsion-proof manner with a tooth member. The tooth member, in a second operating state, prevents a pivoting movement of the actuating member. The tooth member is constructed in a lockable manner with a detent member. The detent member is mounted to be movable with respect to the axis.

According to the disclosure, the tooth member, in the second operating state, prevents a pivoting movement of the actuating member. The tooth member is constructed in a lockable manner with a detent member. The detent member is movably mounted with respect to the axis.

In other words, in accordance with the disclosure, a differentiation is made between a first operating state and a second operating state. In the first operating state, the actuating member is freely pivotable/swivelable or respectively rotatable about the axis. In the second operating state, the swivel position of the actuating member is able to be (clearly) set or respectively fixed.

Particularly preferably, this solution is provided for swivel or respectively clamping devices that are used in particular in automobile manufacture. See in this respect DE 102 56 385 B3, which has a bent lever mechanism and an arresting position that is only possible via a corresponding application of pressure on the operating cylinder. A disadvantage with regard to the arresting position in this solution, moreover, is that because of the bent lever mechanism, the actuating member is not able to be arrested in a uniformly intensive manner in all positions.

The tooth member, according to the disclosure, is optionally configured as a complete (circular) toothed wheel, as in DE 1 183 204 A. Alternatively, it is a tooth element in the form of a sector of a circle (with teeth arranged on its circular arc). Thus, it is dependent on the swivel range of the actuating member.

A detent member is arranged in or respectively on a housing. According to the disclosure, the detent mechanism is only locked in a form-fitting manner with the tooth member in the second operating state. Thus, this brings about the arresting of the actuating member. Accordingly, the detent member is displaceably mounted in the housing in the direction of the axis of the actuating member or respectively of the tooth member. Thus, bringing the detent member into engagement with the tooth member prevents a further rotary movement of the actuating member.

Only for the sake of completeness, reference is also made to the more remote DE 10 2005 017 501 A1.

Further areas of applicability will become apparent from the description. The description and specific examples in this summary are intended for purposes of illustration only and are not intended to limit the scope of the present disclosure.

DRAWINGS

The actuating device according to the disclosure, including its advantageous developments, is explained in further detail below with the aid of the diagrammatic representation of a preferred example embodiment. There are shown respectively diagrammatically.

Figure 2:
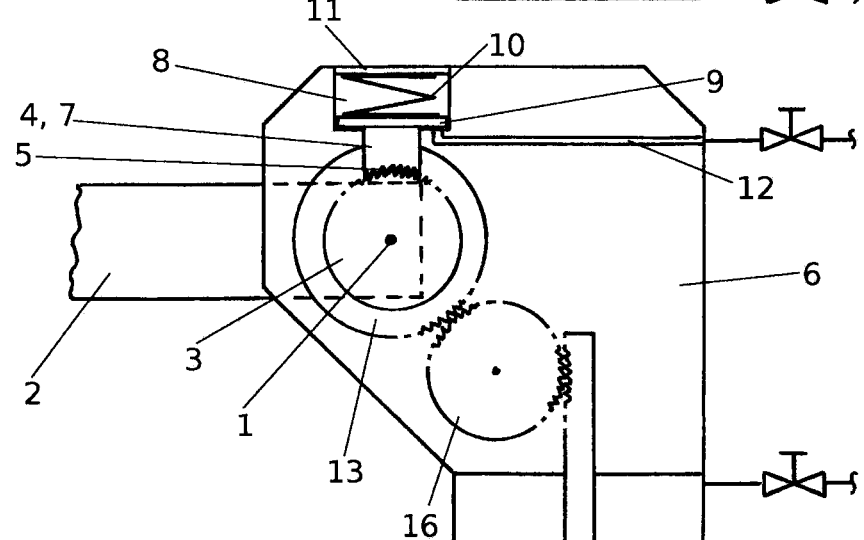

FIG. 1 is a diagrammatic view of an actuating device in a first operating state; and FIG. 2 is a diagrammatic view of the actuating device in a second operating state.

DETAILED DESCRIPTION

The actuating device illustrated in the figures, which is constructed as a so-called clamping- or swivel device in particular for automobile manufacture, includes an actuating member 2. Typically, the actuating member 2 is a clamping or swivel arm on which further tools or the like can be fastened. The actuating member 2 is pivotable in a first operating state (normal operation) about an axis 1. The actuating member 2 is connected in a torsion-proof manner with a toothed member 3. In this and all other toothed wheels, for the sake of simplicity respectively only some teeth are illustrated. The remaining circular arc of the toothed wheels of course likewise is provided at least partially with teeth. In this connection, it is pointed out that the toothed member 3 can be optionally configured as a circular toothed wheel (as illustrated) or as a tooth element in the form of a sector of a circle (not illustrated), with teeth arranged on its circular arc. Furthermore, it is preferred (likewise not illustrated explicitly) that the axis 1 is configured as a shaft (for torque transmission). The actuating member 2 and the toothed member 3 are connected in a torsion-proof manner with this shaft.

In addition, the actuating member 2 is connected in a torsion-proof manner with a driving toothed wheel 13. The driving toothed wheel 13 is rotatable in the first operating state about the axis 1. The driving toothed wheel 13, in turn, is constructed to operatively connect with a drive piston 15. The drive piston 15 is provided with a toothed rack 14. A transmission toothed wheel 16 is arranged between the driving toothed wheel 13 and the toothed rack 14. This influences the transmission ratio. Preferably, the toothed member 3 has finer teeth and a smaller diameter than the driving toothed wheel 13. The drive piston 15 is actuated in a known manner, pneumatically or hydraulically.

It is essential, for the actuating device according to the disclosure, that the toothed member 3, in a second operating state, such as emergency stopping or an arresting operation, prevents a pivoting movement of the actuating member 2. Thus, the toothed member 3 is lockable with a detent member 4. The detent member 4 is mounted so that it is movable, as shown perpendicular, with respect to the axis 1. The detent member 4 is constructed so that it is adjustable in its position with respect to the toothed member 3 to set the first or second operating state. The actuation of the detent member 4 can take place, in principle, optionally pneumatically, hydraulically or electrically. The detent member 4 illustrated in the figures is constructed to be actuatable pneumatically, which will be explained below.

As can be seen from the figures, the detent member 4 has teeth 5 that fit in a form-fitting or meshing manner with respect to the toothed member 3. The detent member 4 is constructed as a bolt that is displaceably mounted in a housing 6 of the actuating device. The teeth 5 are arranged at one end of the bolt. The teeth 5 cooperate with the toothed member 3 in the second operating state as seen in FIG. 2. The other end of the bolt includes a piston rod 7 and a piston 9, that is guided in a cylinder 8 of the housing 6. The piston 9 is acted upon by a force from two sides. Particularly preferably here, as illustrated, the piston 9 is acted upon from one side by a fluid (typically air or oil) and from the other side by a spring 10, particularly a helical compression spring. A duct 12 is arranged on the cylinder 8 opening up for the supply and removal of the fluid. In order to be able to easily mount in the cylinder 8, the arresting bolt or respectively the detent member 4 is closed by a cover 11. Preferably, the cover 11 is of the screw in type arranged on the housing 6.

The actuating device operates as follows. In FIG. 1, the actuating device is illustrated in a first operating state. The teeth 5 of the bolt or respectively of the detent member 4 is not engaged with the teeth of the toothed member 3. Accordingly, via the drive piston 15, when the latter is moved upwards in the drawing by a corresponding application of pressure, first the transmission toothed wheel 16 and hence also the driving toothed wheel 13 are set into rotation. Since the actuating member 2 is connected in a torsion-proof manner with the driving toothed wheel 13, an actuation of the drive piston 15 leads to a pivoting movement of the actuating member 2. Depending on how great the corresponding adjustment travel of the toothed rack 14 is selected to be, this results in a corresponding adjustment angle of the actuating member 2.

It is self-evident here that for the solution according to the disclosure, it is immaterial how the pivoting movement of the actuating member is ultimately initiated. Thus, it would also come entirely into consideration to replace the driving toothed wheel 13, the transmission toothed wheel 16 and the toothed rack 14 by a so-called bent lever mechanism (as already mentioned in the introduction).

In FIG. 1 a fluid has been introduced into the cylinder 8 via the duct 12. If the valve, which is illustrated to the right in the figure, is closed, fluid can no longer leave the cylinder. In addition, the position of the piston 9 and hence also of the bolt with the teeth 5 is defined. The duct 12 is connected to the cylinder 8 such that an application of pressure results in the piston 9 pressing against the spring 10. In turn, the spring 10 rests against the cover 11. If the cylinder 8 is filled with fluid, the actuating device, according to the disclosure, is situated in the first operating state, normal operation, as seen in FIG. 1.

FIG. 2 shows the second operating state or the arresting state where substantially no fluid is situated in the cylinder 8. Due to the spring 10, the piston 9 is displaced inside the cylinder 8 (downward in the figure). The teeth 5 of the detent member 4 and toothed member 3 engage or mesh with one another. This rules out any further pivoting movement of the actuating member 2. This occurs independently of the application of pressure on the drive piston 15, and thus an arresting of the actuating device is reliably ensured.

As indicated in the figures, both the piston 9 of the detent member 4 and the drive piston 15 are able to be acted upon with fluid via corresponding valves or respectively valve control. The disclosure also includes the option that a corresponding control is associated with the actuating device. Thus, control of the fluid application of the piston 9, 15 can be controlled as required, following corresponding movement plans.

The description of the disclosure is merely exemplary in nature and thus, variations that do not depart from the gist of the disclosure are intended to be within the scope of the disclosure. Such variations are not to be regarded as a departure from the spirit and scope of the disclosure.

The invention claimed is:

1. An actuating device, comprising:
   an actuating member to receive a tool, the actuating member pivotable in a first operating state about an axis of a shaft by a drive wheel, the drive wheel secured on the shaft, the actuating member is connected in a torsion-proof manner with an arched toothed member discrete from and positioned adjacent to the drive wheel, the toothed member secured on the shaft;
   the toothed member, in a second operating state, prevents a pivoting movement of the actuating member by the drive wheel, the toothed member is lockable with a detent member, the detent member is movably mounted with respect to the axis.

2. The actuating device according to claim 1, wherein the detent member is adjustable in its position with respect to the toothed member to set the first or second operating state.

3. The actuating device according to claim 1, wherein the detent member includes teeth to mesh with teeth of the toothed member in a form-fitting manner.

4. The actuating device according to claim 1, wherein the detent member includes a bolt that is displaceably mounted in a housing of the actuating device.

5. The actuating device according to claim 4, wherein one end of the bolt includes teeth arranged to cooperate with teeth of the tooth member in the second operating state.

6. The actuating device according to claim 5, wherein another end of the bolt includes a piston rod and a piston guided in a cylinder of the housing.

7. The actuating device according to claim 6, wherein the piston is acted upon by a force from two sides.

8. The actuating device according to claim 7, wherein the piston is acted upon by a fluid force on the first side.

9. The actuating device according to claim 8, wherein the piston is acted upon by a spring force, in particular a helical compression spring, from the second side.

10. The actuating device according to claim 1, wherein the actuating member and the toothed member are connected in a torsion-proof manner with the axis constructed as a shaft.

11. A clamping device, comprising:
    a housing;
    a clamping arm positioned outside the housing to receive additional tools, the clamping arm pivotable in a first operating state about an axis of a shaft by a drive wheel, the drive wheel secured on the shaft inside the housing, the clamping arm is connected in a torsion-proof manner with an arched non-driving toothed member, the toothed member discrete from and positioned adjacent to the drive wheel, the toothed member secured on the shaft;

the toothed member, in a second operating state, prevents a pivoting movement of the clamping arm by a drive mechanism, the toothed member is lockable with a detent member, the detent member is movably mounted with respect to the axis.

12. The clamping device according to claim 11, wherein the detent member is adjustable in its position with respect to the toothed member to set the first or second operating state.

13. The clamping device according to claim 11, wherein the detent member includes teeth to mesh with teeth of the toothed member in a form-fitting manner.

14. The clamping device according to claim 11, wherein the detent member includes a bolt that is displaceably mounted in a housing of the clamping device.

15. The clamping device according to claim 14, wherein one end of the bolt includes teeth arranged to cooperate with teeth of the tooth member in the second operating state.

16. The clamping device according to claim 15, wherein another end of the bolt includes a piston rod and a piston guided in a cylinder of the housing.

17. The clamping device according to claim 16, wherein the piston is acted upon by a force from two sides.

18. The clamping device according to claim 17, wherein the piston is acted upon by a fluid force on the first side.

19. The clamping device according to claim 18, wherein the piston is acted upon by a spring force, in particular a helical compression spring, from the second side.

20. The clamping device according to claim 11, wherein the clamping member and the toothed member are connected in a torsion-proof manner with the axis constructed as a shaft.

* * * * *